United States Patent
Lai et al.

(10) Patent No.: US 6,829,028 B2
(45) Date of Patent: Dec. 7, 2004

(54) WIDE-VIEWING ANGLE DISPLAY DEVICE AND FABRICATION METHOD FOR THEREOF

(75) Inventors: Chih-Ming Lai, Hsinchu (TW);
Yang-Yi Fan, Taichung (TW);
Chia-Rong Sheu, Tainan (TW);
Ching-Yih Chen, Miaoli (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/448,669

(22) Filed: May 29, 2003

(65) Prior Publication Data

US 2004/0105062 A1 Jun. 3, 2004

(30) Foreign Application Priority Data

Dec. 2, 2002 (TW) ........................................ 91134946 A

(51) Int. Cl.[7] .............................................. G02F 1/1337
(52) U.S. Cl. ........................................ 349/130; 349/141
(58) Field of Search ................................ 349/129, 130, 349/141, 122, 139, 84

(56) References Cited

U.S. PATENT DOCUMENTS

| | | | | |
|---|---|---|---|---|
| 5,995,186 A | | 11/1999 | Hiroshi | |
| 6,188,457 B1 | * | 2/2001 | Liu | 349/124 |
| 6,313,899 B1 | * | 11/2001 | Wu et al. | 349/130 |
| 6,424,396 B1 | * | 7/2002 | Kim et al. | 349/130 |
| 6,657,695 B1 | * | 12/2003 | Song et al. | 349/143 |
| 6,710,837 B1 | * | 3/2004 | Song et al. | 349/143 |

FOREIGN PATENT DOCUMENTS

EP          0 884 626 A2      12/1998

* cited by examiner

*Primary Examiner*—Tarifur R. Chowdhury
*Assistant Examiner*—David Chung
(74) *Attorney, Agent, or Firm*—Quintero Law Office

(57) ABSTRACT

A wide-viewing angle display device serves as a multi-domain vertical alignment (MVA) mode liquid crystal display (LCD) device or an in-plane switching (IPS) mode liquid crystal display (LCD) device. A plurality of protrusions is formed on the inner surface of the glass substrate, and an electrode array is formed on the tops of the protrusions. Thus, the electrodes are suspended in the liquid crystal cell gap, and a transverse electrical field is generated by the electrodes to drive the liquid crystal molecules.

26 Claims, 6 Drawing Sheets

WIDE-VIEWING ANGLE DISPLAY DEVICE AND FABRICATION METHOD FOR THEREOF

BACKGROUND OF THE INVENTION

1. Field of the Invention

The invention relates to a wide-viewing angle LCD technology, and more particularly to a wide-viewing angle LCD device with an electrode array suspended in an LC cell gap between two substrates which provides a transverse electrical field to drive LC molecules.

2. Description of the Related Art

Conventional TFT-LCDs (thin film transistor liquid crystal displays) devices, which use LC molecules with characteristics of rotary polarization and dual refractive effects so that incident light achieves bright and shade results, has a drawback known as a viewing angle dependency, that is, the contrast ratio decreases as the viewing angle increases. Thus presenting a difficulty in applying the TFT-LCD device to large-size display products.

Recently, various wide-viewing angle technologies have been proposed, such as an optical compensation film, a multi-domain vertical alignment (MVA) mode, and an in-plane switching (IPS) mode. The MVA mode LCD device uses a negative LC material, vertical alignment films, symmetrical protrusions and boundary electrical field effect, in which a pixel electrode array and a common electrode array formed on two substrates respectively provide a vertical electrical field to drive the LC molecules, thus increasing contrast ratio and response speed and solves problems of gray scale inversion and color shift. The IPS mode LCD device uses a TN (twisted nematic) LC material and a wide-viewing angle diffuser, in which a pixel electrode array and a common electrode array formed on a TFT array substrate provide a horizontal electrical field to drive the LC molecules, thus solves color shift caused by different viewing angles and increases the viewing angle.

EP No.0884626A2 discloses an MVA mode LCD device. FIG. 1A is a sectional diagram illustrating a conventional MVA mode LCD device. FIG. 1B is a diagram illustrating the variation in alignment of LC molecules shown in FIG. 1A.

In FIG. 1A, an MVA mode LCD cell 10 comprises an upper glass substrate 12, a lower glass substrate 14, and an LC layer 16 with a negative anisotropy of dielectric constant filling in the space between the two glass substrates 12 and 14. Two electrodes 18I and 18II and two vertical alignment layers 20I and 20II are formed on the inner surface of the glass substrates 12 and 14. In general, the upper glass substrate 12 serves as a color filter substrate. The lower glass substrate 14 serves as a thin film transistor (TFT) substrate where a plurality of TFTs and active matrix drive circuits are formed. The electrode 18II on the lower glass substrate 14 serves as a pixel electrode.

Furthermore, the LCD cell 10 has alignment-control structures including a plurality of first stripe-shaped protrusions 22I formed on the inner surface of the upper glass substrate 12 and sandwiched between the electrode 18I and the vertical alignment layer 20I, and a plurality of second stripe-shaped protrusions 22II formed on the inner surface of the lower glass substrate 14 and sandwiched between the electrode 18II and the vertical alignment layer 20II. When no voltage is applied, all the LC molecules are s aligned perpendicular to the vertical alignment layers 20I and 20II, respectively. For example, the LC molecules 16A are aligned perpendicular to the glass substrates 12 and 14. The LC molecules 16B above the protrusions 22I and 22II are perpendicular to the vertical alignment layers 20I and 20II, so that the LC molecules 16B pretilt at an angle to the glass substrates 12 and 14.

In FIG. 1B, after a voltage is applied to the LCD cell 10, the LC molecules 16A and 16B rotate toward a direction corresponding to an electrical field 24 to tilt at an angle depending on the voltage value. The arrows show the rotating directions of the LC molecules 16A and 16B. Within a pixel area, two alignment domains are formed at both sides of the first protrusion 22I or the second protrusion 22II. The LC molecules 16A and 16B disposed adjacent to the protrusions 22I and 22II has a pretilt effect before applying voltage, however, which conflicts with the rotating effect generated by the electrical field adjacent the electrode fringe after applying voltage, causing decreased response speed, disclination and poor viewing.

U.S. Pat. No. 5,995,186 discloses an IPS mode LCD device. FIG. 2A is a sectional diagram illustrating a conventional IPS mode LCD device. FIG. 2B is a sectional diagram illustrating the variation in alignment of LC molecules shown in FIG. 2A.

An IPS mode LCD cell 30 comprises an upper glass substrate 32, a lower glass substrate 34 and an LC layer 36 interposed in a space between the two glass substrates 32 and 34 and sandwiched between an upper alignment layer 38I and a lower alignment layer 38II. The lower glass substrate 34, serving as a TFT array substrate, comprises a plurality of TFTs, scanning lines, data lines, common electrodes, pixel electrodes and an active matrix driving circuit. The two adjacent electrodes 40I and 40II serve as a data line and a common electrode, alternatively a common electrode and a pixel electrode. After a driving voltage is applied to the IPS mode LCD cell 30, an in-plane electrical field 42 is generated between two adjacent electrodes 40I and 40II and parallel to the long axis of the LC molecules 36A, 36B and 36C so that the LC molecules 36A, 36B and 36C are rotated on the plane.

Since the data lines, common electrodes, pixel electrodes are provided on the lower glass substrate 34, the intensity of the in-plane electrical field 42 weakens as the in-plane electrical field 42 is distanced from the lower glass substrate 34. Thus, the intensity of the in-plane electrical field 42 for driving the LC molecules 36A or 36B is less than that for driving the LC molecule 36C. The LC molecule 36C adjacent to the lower glass substrate 34 where a higher intensity of in-plane electrical field 42 is applied, however, is difficult to drive on because of boundary conditions. The center of the LC layer 36, such as the LC molecule 36B, is more easily driven on but lacks a strong intensity of electrical field.

SUMMARY OF THE INVENTION

The present invention is a wide-viewing angle LCD device with an electrode array suspended in an LC cell gap between two substrates which provides a transverse electrical field to drive LC molecules.

Accordingly, the present invention provides a multi-domain vertical alignment (MVA) mode liquid crystal display (LCD) device. An upper glass substrate and a lower glass substrate are disposed parallel to each other, and a liquid crystal layer of positive dielectric anisotropy is formed in a space between the upper glass substrate and the lower glass substrate. A plurality of first protrusions is formed on the inner surface of the upper glass substrate. A plurality of common electrodes is formed on the tops of the first protrusions, respectively. A plurality of second protrusions is formed on the inner surface of the lower substrate, in which the first protrusions and the second protrusions are arranged alternately. A plurality of pixel electrodes is formed on the tops of the second protrusions, respectively, in which the pixel electrodes and the common electrodes are arranged alternately. After applying a voltage to the display device, a transverse electrical field is generated between the common electrode and the pixel electrode to drive the liquid crystal molecules, and two alignment domains are formed at both sides of the first protrusion.

Accordingly, the present invention also provides a multi-domain vertical alignment (MVA) mode liquid crystal display (LCD) device. An upper glass substrate and a lower glass substrate are disposed parallel to each other, and a liquid crystal layer of positive dielectric anisotropy is formed in a space between the upper glass substrate and the lower glass substrate. A plurality of first common electrodes is formed on the inner surface of the upper glass substrate. A plurality of second common electrodes is formed on the inner surface of the lower glass substrate, in which the second common electrodes are positioned corresponding to the first common electrodes. A plurality of protrusions is formed on the inner surface of the lower substrate, in which the protrusions and the second common electrodes are arranged alternately. A plurality of pixel electrodes is formed on the tops of the protrusions, respectively, in which the pixel electrodes and the second common electrodes are arranged alternately. After applying a voltage to the display device, a transverse electrical field is generated between the second common electrode and the pixel electrode to drive the liquid crystal molecules, and two alignment domains are formed at both sides of the protrusion.

Accordingly, the present invention also provides an in-plane switching (IPS) mode liquid crystal display (LCD) device. An upper glass substrate and a lower glass substrate are disposed parallel to each other, and a liquid crystal layer is formed in a space between the upper glass substrate and the lower glass substrate. A plurality of first protrusions is formed on the inner surface of the lower glass substrate. A plurality of second protrusions is formed on the inner surface of the lower substrate, in which the first protrusions and the second protrusions are arranged alternately. A plurality of first electrodes is formed on the tops of the first protrusions, respectively. A plurality of second electrodes is formed on the tops of the second protrusions, respectively, in which the first electrodes and the second electrodes are arranged alternately. After applying a voltage to the display device, a transverse electrical field is generated between the first electrode and the second electrode to drive the liquid crystal molecules.

DESCRIPTION OF THE DRAWINGS

For a better understanding of the present invention, reference is made to a detailed description to be read in conjunction with the accompanying drawings.

DETAILED DESCRIPTION OF THE INVENTION

The present invention provides a wide-viewing angle LCD device, in which an electrode array is formed in an LC cell gap between two substrates to provide a transverse electrical field for driving LC molecules. The electrode array structure of the wide-viewing angle LCD device is applied to MVA mode or IPS mode LCD device.

First Embodiment

Figure 1A:
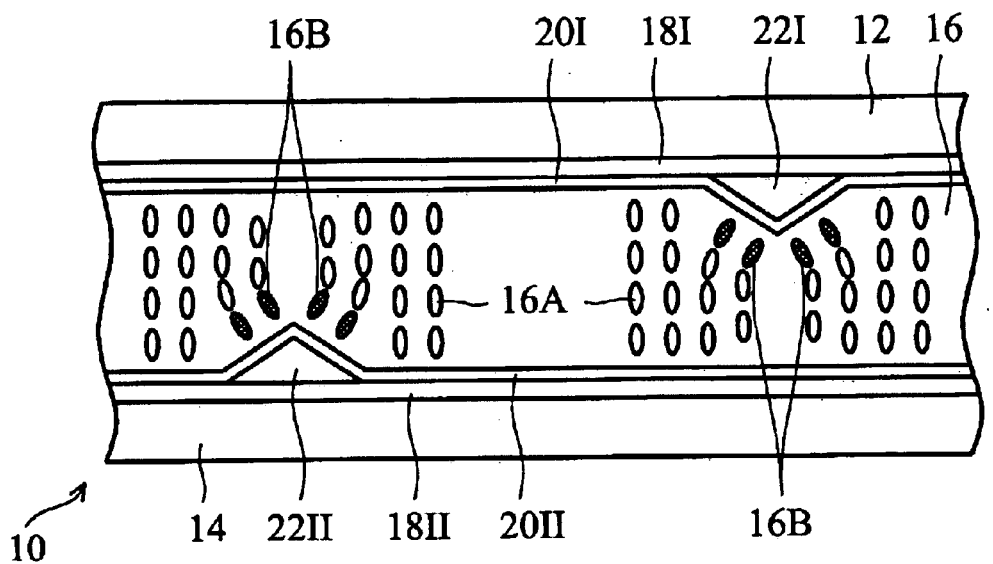
FIG. 1A is a sectional diagram illustrating a conventional MVA mode LCD device.
Figure 1B:
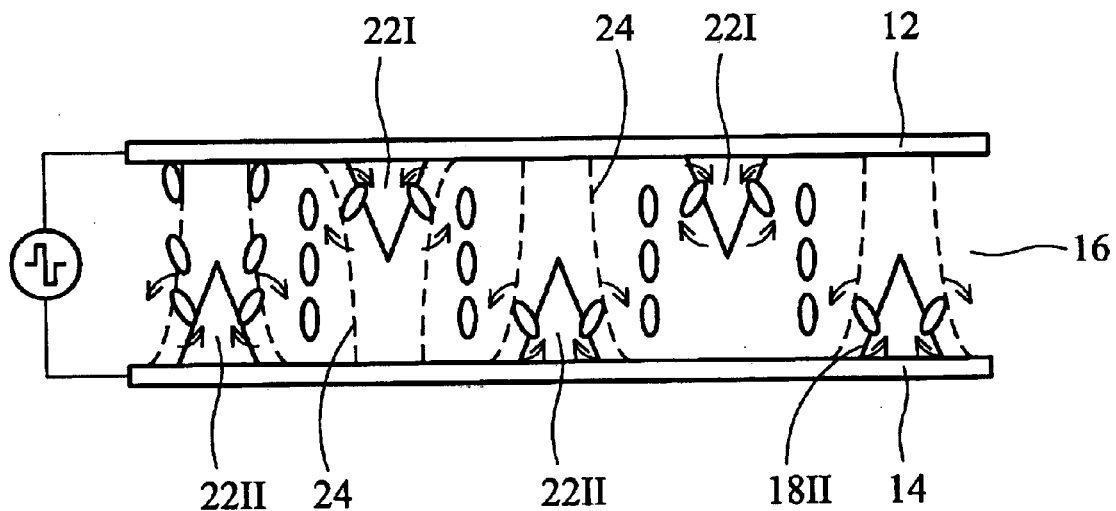
FIG. 1B is a diagram illustrating the variation in alignment of LC molecules shown in FIG. 1A.
Figure 2A:
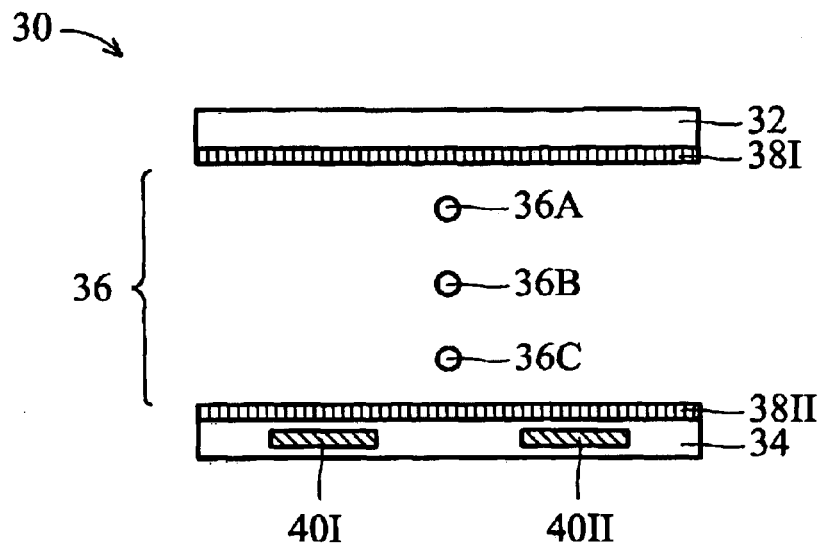
FIG. 2A is a sectional diagram illustrating a conventional IPS mode LCD device.
Figure 2B:
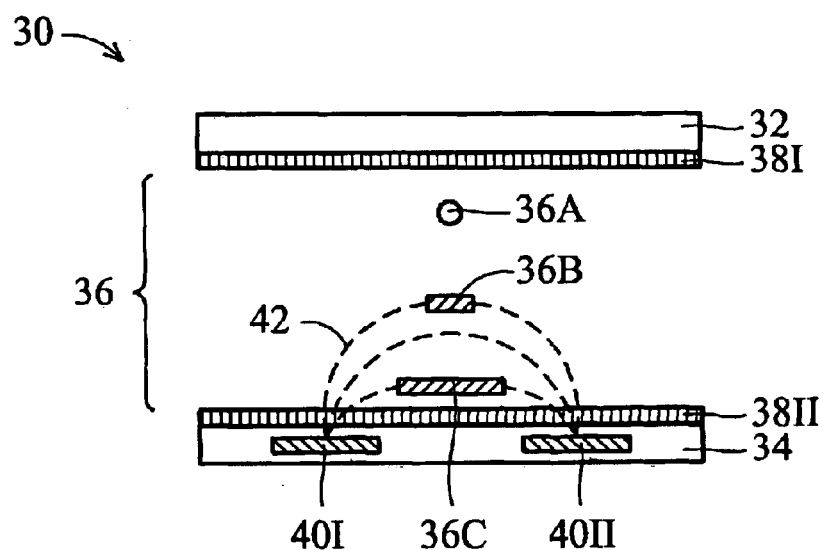
FIG. 2B is a sectional diagram illustrating the variation in alignment of LC molecules shown in FIG. 2A.
Figure 3:
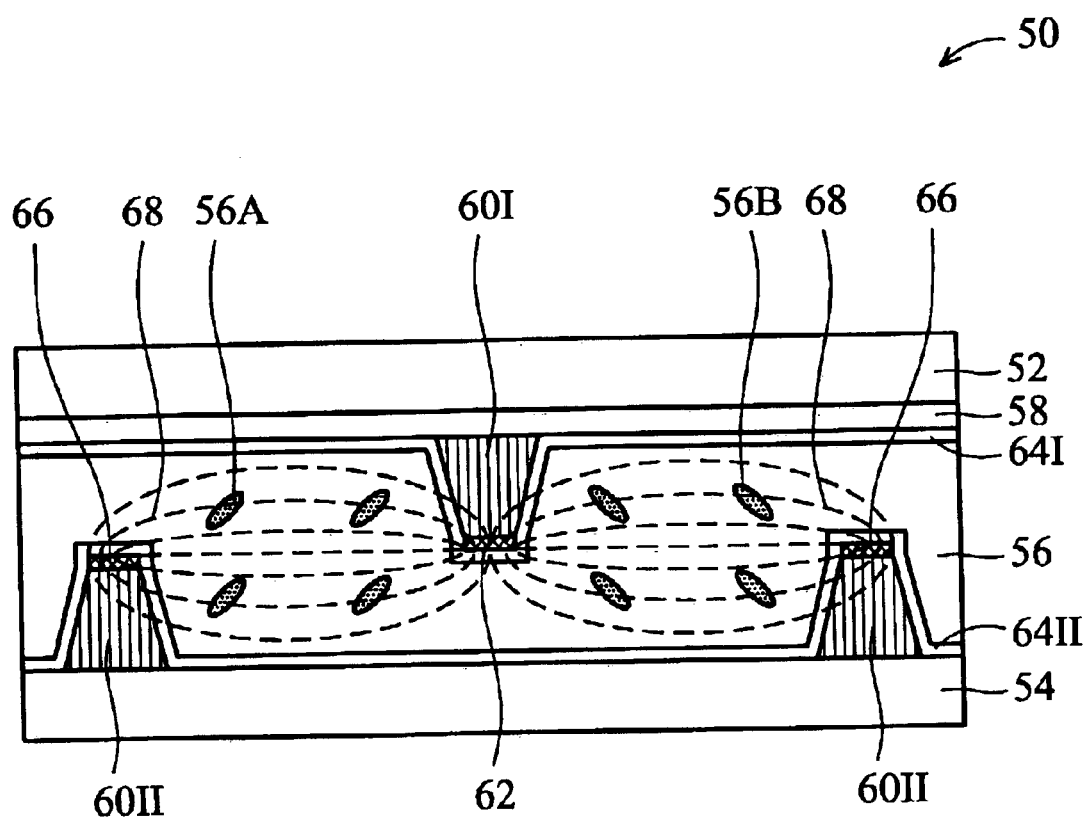
FIG. 3 is a sectional diagram illustrating an MVA mode LCD device according to the first embodiment of the present invention.

FIG. 3 is a sectional diagram illustrating an MVA mode LCD device according to the first embodiment of the present invention. AN MVA mode LCD device 50 comprises an upper substrate 52 of transparent glass and a lower substrate 54 of transparent glass disposed parallel to each other, and an LC layer 56 is formed in a space therebetween. The upper glass substrate 52 serves as a CF (color filter) substrate, on which a black matrix layer 58 is partially overlapped with a plurality of color elements. Also, a plurality of first protrusions 60I is formed on the black matrix layer 58, and plurality of common electrodes 62 is formed on the tops of the first protrusions 60I, respectively. Moreover, a first alignment layer 64I is formed on the exposed surface of the black matrix layer 58, the first protrusions 60I and the common electrodes 62.

The lower substrate 54 serves as a TFT array substrate, on which a plurality of TFTs and an active matrix driving circuit are formed. Also, a plurality of second protrusions 60II is formed on the inner surface of the lower substrate 54, and a plurality of pixel electrodes 66 are formed on the tops of the second protrusions 60II respectively. Moreover, a second alignment layer 64II is formed on the exposed surface of the lower substrate 54, the second protrusions 60II and the pixel electrodes 66.

The first protrusions 60I and the second protrusions 60II are arranged alternately, so that the common electrodes 62 and the pixel electrodes 66 are arranged alternately. After applying a voltage to the MVA mode LCD device 50, a transverse electrical field 68, parallel to the two substrates 52 and 54, is generated between two adjacent common electrodes 62 and pixel electrodes 66 to drive the LC molecules 56A and 56B. Within one pixel area, two alignment domains are formed at both sides of the first protrusion 60I. Similarly, two alignment domains are formed at both sides of the second protrusion 60II.

The common electrode 62, formed on the top of the first protrusion 60I, is suspended in the LC cell gap. Also, the pixel electrode 66, formed on the top of the second protrusion 60II, is suspended in the LC cell gap. Preferably, by controlling the thickness and profile of the first protrusions 60I and the second protrusions 60II, the common electrode 62 and the pixel electrode 66 are positioned on the same plane. Alternatively, the top of the common electrode 62 exceeds the top of the pixel electrode 66 by a small distance. Accordingly, the common electrode 62 and the pixel electrode 66 suspended in the LC cell gap solves the conflict between the pretilt effect adjacent to the protrusions 60I and 60II and the rotating effect adjacent to the fringe electrical field, thus increasing response speed, and eliminates disinclination and provides excellent visual results.

In addition, the LC layer 56 is preferably made of a positive dielectric anisotropy material which has positive optics. Also, for the LC molecules, the refractive index in a long axis direction is larger than the refractive index in a vertical direction, that is, $\Delta n = n_e - n_o 0 >$. When a voltage is applied to the LCD device, the dielectric constant difference of the LC molecules is larger than zero, that is, $\Delta \epsilon = \epsilon_{//} - \epsilon_\perp$, to determine the rotating direction of the LC molecules parallel to the electrical field. Thus, the MVA mode LCD device 50 has high response speed.

Figure 4A:
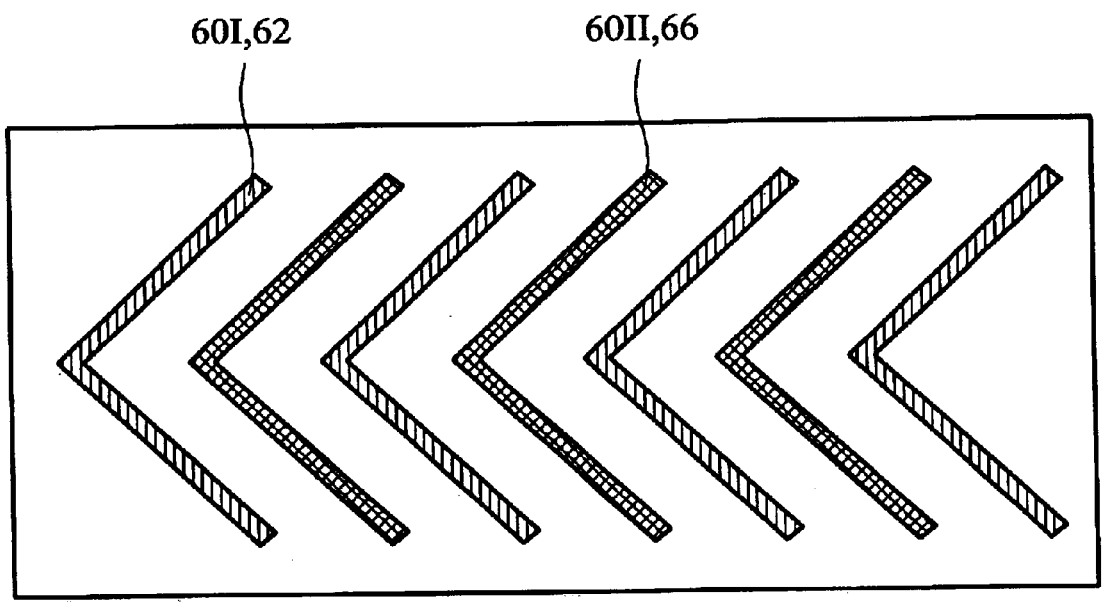
FIGS. 4A and 4B are plane views of the protrusions and electrodes shown in FIG. 3.
Figure 4B:
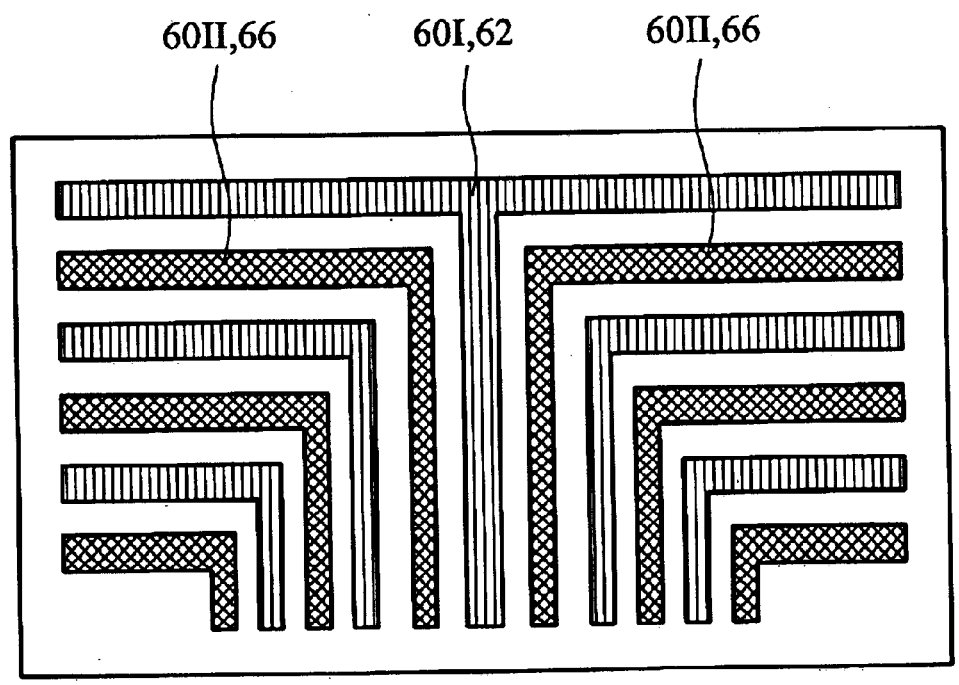

The fabrication method for the first protrusion 60I, the second protrusion 60II, the common electrode 62 and the pixel electrode 66 are now described. First, using coating or deposition, a photoresist layer, a polymer layer or an oxide layer is formed on a substrate to serve as a protrusion layer 60. Then, using lithography with development or photolithography with etching in accordance with the material characteristics of the protrusion layer 60, the protrusion layer 60 is patterned to become the first protrusions 60I and the second protrusions 60II. Next, using sputtering or deposition, a conductive layer of ITO or Al alloy, is formed on the substrate. Then, using photolithography and dry etching, the conductive layer disposed outside the top of the first protrusions 60I and the second protrusions 60II is removed, thus the remaining portion of the conductive layer serves as the common electrode 62 and the pixel electrode 66. The profiles of the first protrusion 60I, the second protrusion 60II, the common electrode 62, and the pixel electrode 66 can be appropriately modified as a stripe, arc, or sawtooth shape, to satisfy demands for process and product. In one case shown in FIG. 4A, each the first protrusion 60I and the second protrusion 60II has a ⟨-shaped profile, thus the common electrode 62 and the pixel electrode 66 has a ⟨-shaped profile. In another case shown in FIG. 4B, each the first protrusion 60I and the second protrusion 60II has a ⌉-shaped profile or a ⌈-shaped profile, thus the common electrode 62 and the pixel electrode 66 has a ⌉-shaped profile or a ⌈-shaped profile.

Second Embodiment

Figure 5:
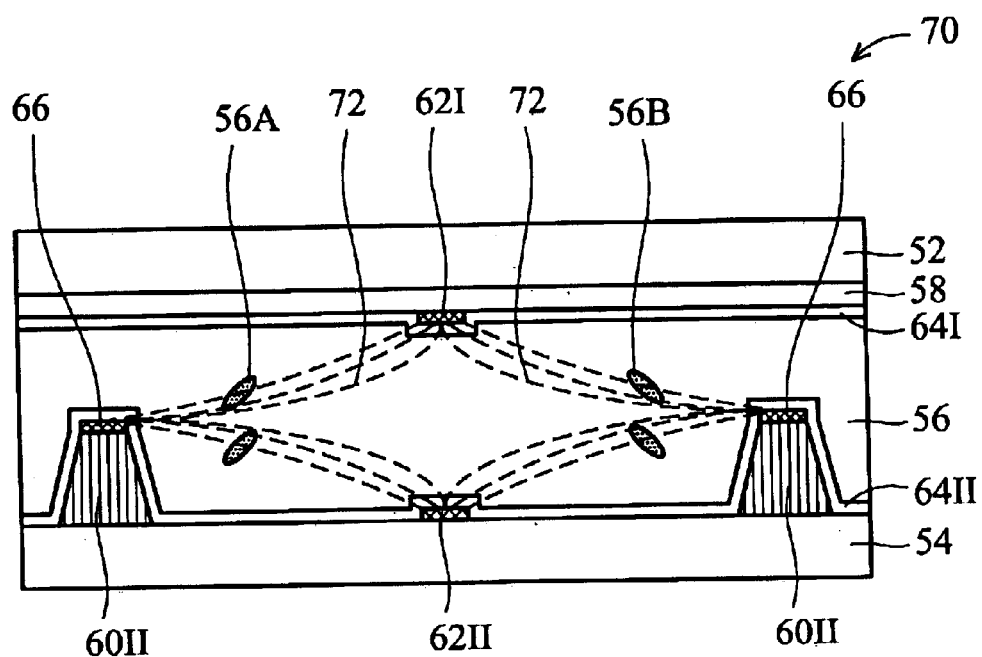
FIG. 5 is a sectional diagram illustrating an MVA mode LCD device according to the second embodiment of the present invention.

FIG. 5 is a sectional diagram illustrating an MVA mode LCD device according to the second embodiment of the present invention. AN MVA mode LCD device 70 in the second embodiment is substantially similar to the MVA mode LCD device 50 of the first embodiment, with the similar portions omitted herein. Regarding the dissimilar portions, the fabrication of the first protrusion 60I is omitted from the upper substrate 52, and a plurality of first common electrodes 62I is formed on the black matrix layer 58 of the upper substrate 52. Also, a plurality of second common electrodes 62II is formed on the lower substrate 54 and in a position corresponding to the first common electrodes 62I. The first common electrodes 62 and the pixel electrodes 66 are arranged alternately, so that the second common electrode 62II and the pixel electrodes 66 are arranged alternately.

The pixel electrodes 66 are suspended in the LC cell gap, and the common electrodes 62I and 62II are formed on the surface of the two substrates 52 and 54. After a voltage is applied to the MVA mode LCD device 70, the LC molecules 56A and 56B are driven by a transverse electrical field 72 tilting at an angle to the substrate 52 or 54. Within one pixel area, two alignment domains are formed at both sides of the first common electrode 62I. Similarly, two alignment domains are formed at both sides of the second common electrode 62II.

Also, the LC layer 56 is preferably made of a positive dielectric anisotropy material which has positive optics and a larger difference in dielectric constant. Thus, the MVA mode LCD device 70 has high response speed.

The fabrication method for the second protrusion 60II and the pixel electrodes 66 in the second embodiment is substantially similar to that of the first embodiment, with the similar portions omitted herein. The profiles of the second protrusion 60II, the common electrodes 62I and 62II and the pixel electrode 66 can be appropriately modified as a stripe, arc, or sawtooth shape, to satisfy demands for process and product. In one case shown in FIG. 4A, each of the second protrusions 60II, the pixel electrodes 66, and the common electrodes 62I and 62I has a ⟨-shaped profile. In another case shown in FIG. 4B, each of the second protrusions 60II, the pixel electrodes 66 and the common electrodes 62I and 62II has a ⌉-shaped profile or a ⌈-shaped profile.

Third Embodiment

Figure 6:
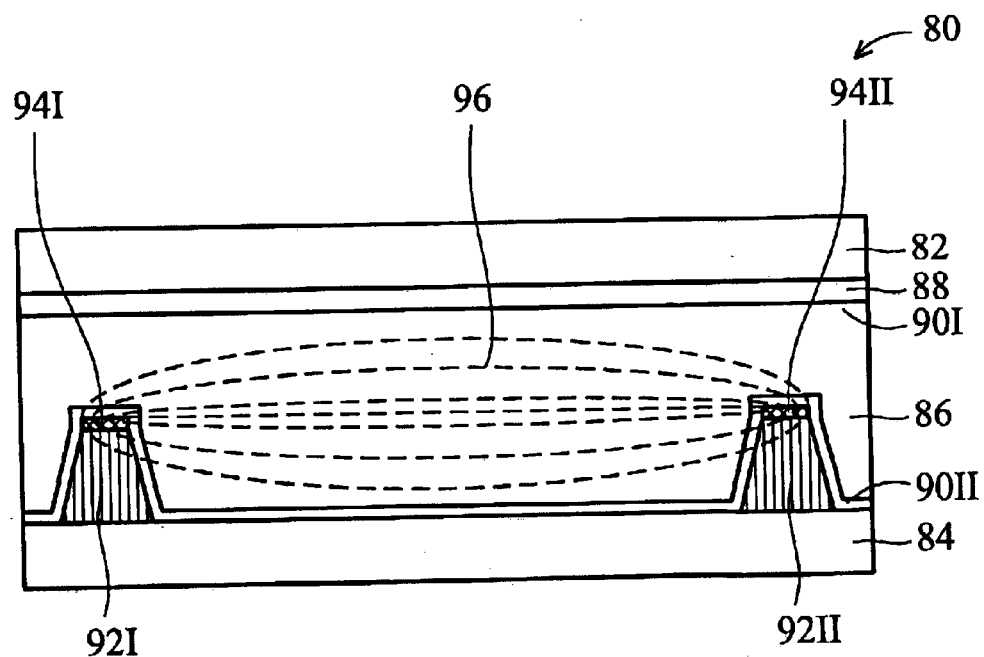
FIG. 6 is a sectional diagram illustrating an IPS mode LCD device according to the third embodiment of the present invention.

FIG. 6 is a sectional diagram illustrating an IPS mode LCD device according to the third embodiment of the present invention. An IPS mode LCD device 80 comprises an upper substrate of transparent glass and a lower substrate 84 of transparent glass disposed in parallel to each other, and an LC layer is formed in a space therebetween. The upper substrate 82 serves as a CF substrate, which comprises a black matrix layer 88 with a plurality of color elements formed on the inner surface of the upper substrate 82, and a first alignment layer 90I formed on the black matrix layer 88.

The lower substrate 84 serves as a TFT array substrate, which comprises a plurality of TFTs and an active matrix driving circuit. Also, a plurality of first protrusions 92I and a plurality of second protrusions 92II are arranged alternately on the inner surface of the lower substrate 84, a plurality of first electrodes 94I is formed on the tops of the first protrusions 92I respectively, and a plurality of second electrodes 94II is formed on the tops of the second protrusions 92II respectively. Moreover, a second alignment layer 90II is formed on the exposed surface of the protrusions 92I and 92II, the electrodes 94I and 94II and the lower substrate 84.

The two adjacent electrodes 94I and 94II serve as a data line and a common electrode, alternatively a common electrode and a pixel electrode. After applying a voltage to the IPS mode LCD device 80, a transverse electrode field 96 parallel to the two substrates 82 and 82 is generated between the two adjacent electrodes 94I and 94II to drive the LC molecules, thus the in-plane rotation of the LC molecules achieves a wide-viewing angle result.

Since the electrodes 94I and 94II are disposed on the tops of the protrusions 92I and 92II, the electrodes 94I and 94II are suspended in the LC cell gap. Preferably, by controlling the thickness and profile of the protrusions 92I and 92II, the electrodes 94I and 94II are positioned on the same plane at the center of the LC cell gap. Accordingly, the intensity of the transverse electrical field 96 at the center of the LC cell gap is the strongest, effectively driving the LC molecules positioned there.

Figure 7:
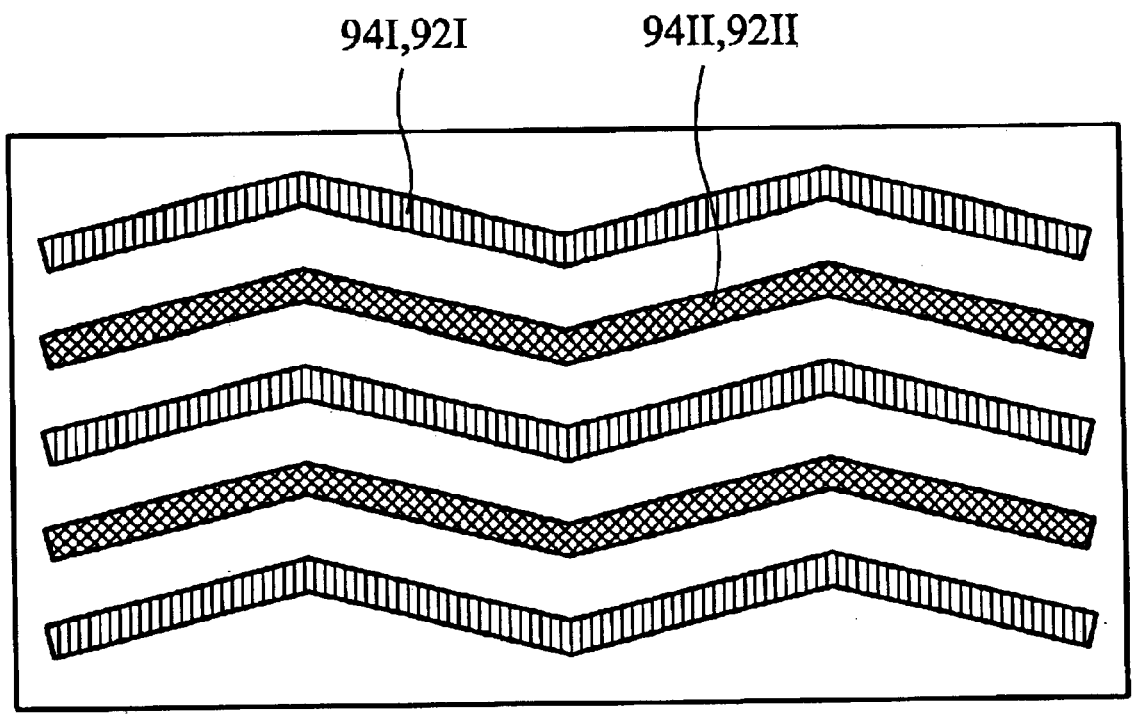
FIG. 7 is a plane view of the protrusions and electrodes shown in FIG. 6.

The fabrication method for the protrusions 92I and 92II and the electrodes 94I and 94II in the third embodiment is substantially similar to that of the first embodiment, with the similar portions omitted herein. The profiles of the protrusions 92I and 92II and the electrodes 94I and 94II can be appropriately modified as a stripe, arc, or sawtooth shape, to satisfy demands for process and product. Preferably, in FIG. 7, each of the protrusions 92I and 92II and the electrodes 94I and 94II has a ⟨-shaped successive profile.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wide-viewing angle display device which is a multi-domain vertical alignment (MVA) mode liquid crystal display (LCD) device, comprising:
   an upper glass substrate and a lower glass substrate disposed parallel to each other;
   a liquid crystal layer of positive dielectric anisotropy formed in a space between the upper glass substrate and the lower glass substrate;
   a plurality of first protrusions formed on the inner surface of the upper glass substrate;
   a plurality of common electrodes formed on the tops of the first protrusions, respectively;
   a plurality of second protrusions formed on the inner surface of the lower substrate, in which the first protrusions and the second protrusions are arranged alternately; and
   a plurality of pixel electrodes formed on the tops of the second protrusions, respectively, in which the pixel electrodes and the common electrodes are arranged alternately;
   wherein, after applying a voltage to the display device, a transverse electrical field is generated between the common electrode and the pixel electrode to drive the liquid crystal molecules, and two alignment domains are formed at both sides of the first protrusion.

2. The wide-viewing angle display device of claim 1, further comprising:
   a first alignment layer covering the first protrusions and the common electrodes on the upper substrate.

3. The wide-viewing angle display device of claim 1, further comprising:
   a second alignment layer covering the second protrusions and the pixel electrodes on the lower substrate.

4. The wide-viewing angle display device of claim 1, wherein each the first protrusion and the second protrusion is a photoresist layer, a polymer layer or an oxide layer.

5. The wide-viewing angle display device of claim 1, wherein each top of the common electrodes and each top of the pixel electrodes are on the same plane.

6. The wide-viewing angle display device of claim 1, wherein each of the first protrusion and the second protrusion has a tripe profile, an arc profile, a sawtooth-shaped profile, a ⟨-shaped profile, a ]-shaped profile or a ⌈-shaped profile.

7. A wide-viewing angle display device which is a multi-domain vertical alignment (MVA) mode liquid crystal display (LCD) device, comprising:
   an upper glass substrate and a lower glass substrate disposed parallel to each other;
   a liquid crystal layer of positive dielectric anisotropy formed in a space between the upper glass substrate and the lower glass substrate;
   a plurality of first common electrodes formed on the inner surface of the upper glass substrate;
   a plurality of second common electrodes formed on the inner surface of the lower substrate, in which the second common electrodes are positioned corresponding to the first common electrodes, respectively;
   a plurality of protrusions formed on the inner surface of the lower substrate, in which the protrusions and the second common electrodes are arranged alternately; and
   a plurality of pixel electrodes formed on the tops of the protrusions, respectively, in which the pixel electrodes and the second common electrodes are arranged alternately;
   wherein, after applying a voltage to the display device, a transverse electrical field is generated between the second common electrode and the pixel electrode to drive the liquid crystal molecules, and two alignment domains are formed at both sides of the protrusion.

8. The wide-viewing angle display device of claim 7, further comprising:
   a first alignment layer covering the first common electrodes and the upper substrate.

9. The wide-viewing angle display device of claim 7, further comprising:
   a second alignment layer covering the protrusions, the pixel electrodes, and the second common electrodes on the lower substrate.

10. The wide-viewing angle display device of claim 7, wherein the protrusion is a photoresist layer, a polymer layer or an oxide layer.

11. The wide-viewing angle display device of claim 7, wherein each top of the pixel electrodes is higher than each top of the second common electrodes.

12. The wide-viewing angle display device of claim 7, wherein the protrusion has a tripe profile, an arc profile, a sawtooth-shaped profile, a ⟨-shaped profile, a ]-shaped profile or a ⌈-shaped profile.

13. The wide-viewing angle display device of claim 7, wherein each the first common electrode and the second common electrode has a tripe profile, an arc profile, a sawtooth-shaped profile, a ⟨-shaped profile, a ]-shaped profile or a ⌈-shaped profile.

14. A wide-viewing angle display device which is an in-plane switching (IPS) mode liquid crystal display (LCD) device, comprising:
   an upper glass substrate and a lower glass substrate disposed parallel to each other;
   a liquid crystal layer formed in a space between the upper glass substrate and the lower glass substrate;
   a plurality of first protrusions formed on the inner surface of the lower glass substrate;
   a plurality of second protrusions formed on the inner surface of the lower substrate, in which the first protrusions and the second protrusions are arranged alternately;
   a plurality of first electrodes formed on the tops of the first protrusions, respectively; and
   a plurality of second electrodes formed on the tops of the second protrusions, respectively, in which the first electrodes and the second electrodes are arranged alternately;
   wherein, after applying a voltage to the display device, a transverse electrical field is generated between the first electrode and the second electrode to drive the liquid crystal molecules.

15. The wide-viewing angle display device of claim 14, further comprising:
   a first alignment layer formed on the inner surface of the upper substrate.

16. The wide-viewing angle display device of claim 14, further comprising:
a second alignment layer covering the first protrusions, the second protrusions, the first electrodes, and the second electrodes on the lower substrate.

17. The wide-viewing angle display device of claim 14, wherein each of the first protrusions and the second protrusion is a photoresist layer, a polymer layer, or an oxide layer.

18. The wide-viewing angle display device of claim 1, wherein each top of the first electrodes and each top of the second electrodes are at the same plane.

19. The wide-viewing angle display device of claim 14, wherein each the first protrusion and the second protrusion has a ⟨-shaped successive profile.

20. A fabrication method for a wide-viewing angle display device, comprising steps of:
providing a glass substrate;
forming a protrusion layer on the glass substrate;
patterning the protrusion layer to form a plurality of first protrusions and second protrusions, in which the first protrusions and the second protrusions are arranged alternately;
forming a conductive layer on the glass substrate to cover the first protrusions and the second protrusions; and
performing photolithography and etching to remove the conductive layer outside the tops of the first protrusions and the tops of the second protrusions, in which the remaining portion of the conductive layer on the top of the first protrusion serves as a first electrode, and the remaining portion of the conductive layer on the top of the second protrusion serves as a second electrode.

21. The fabrication method for a wide-viewing angle display device of claim 20, further comprising a step of:
forming an alignment layer on the exposed surface of the first protrusions, the second protrusions, the first electrodes, and the second electrodes.

22. The fabrication method for a wide-viewing angle display device of claim 20, wherein each the first protrusion and the second protrusion is a photoresist layer, a polymer layer or an oxide layer.

23. The fabrication method for a wide-viewing angle display device of claim 20, wherein the top of the first electrode and the top of the second electrode are on the same plane.

24. The fabrication method for a wide-viewing angle display device of claim 20, further comprising a step of:
forming a plurality of third electrodes on the inner surface of the glass substrate, in which the third electrode is positioned between the first protrusion and the second protrusion.

25. The fabrication method for a wide-viewing angle display device of claim 20, wherein each the first electrode and the second electrode has a tripe profile, an arc profile, a sawtooth-shaped profile, a ⟨-shaped profile, a ]-shaped profile or a ⌈-shaped profile.

26. The fabrication method for a wide-viewing angle display device of claim 20, wherein the wide-viewing angle display device is a multi-domain vertical alignment (MVA) mode liquid crystal display (LCD) device or an in-plane switching (IPS) mode liquid crystal display (LCD) device.

* * * * *